United States Patent [19]
Doring

[11] Patent Number: 5,738,778
[45] Date of Patent: Apr. 14, 1998

[54] METHOD RELATED TO THE STERILIZATION OF MICROORGANISMS AND/OR TO THE MINERALIZATION OF ORGANIC SUBSTANCES INCLUDING MICROBIC METABOLITES IN A GROUND REGION AND IN THE GROUND WATER BY MEANS OF ELECTRIC CURRENT

[75] Inventor: Falk Doring, Stuttgart, Germany

[73] Assignee: P + P Geotechnik GmbH Ingenieure fur Boden-Und Grundwassersanierungen, Stuttgart, Germany

[21] Appl. No.: 607,076

[22] Filed: Feb. 26, 1996

[30] Foreign Application Priority Data

Feb. 28, 1995 [DE] Germany ............... 195 06 911.0

[51] Int. Cl.$^6$ .................................................. C02F 1/461
[52] U.S. Cl. ............... 205/701; 205/744; 205/758; 205/761; 205/766
[58] Field of Search .......................... 205/701, 744, 205/758, 761, 766

[56] References Cited

U.S. PATENT DOCUMENTS

| | | | |
|---|---|---|---|
| 3,752,747 | 8/1973 | Treharne et al. | 205/744 |
| 4,383,901 | 5/1983 | Smith et al. | |
| 4,479,857 | 10/1984 | Barton, Jr. | 204/130 |
| 4,758,318 | 7/1988 | Yoshida | 205/701 |
| 4,983,267 | 1/1991 | Moeglich et al. | |
| 5,074,986 | 12/1991 | Probstein et al. | |
| 5,137,608 | 8/1992 | Acar et al. | |
| 5,281,312 | 1/1994 | Woodside | 205/701 |

FOREIGN PATENT DOCUMENTS

| | | |
|---|---|---|
| 0 312 174 | 4/1989 | European Pat. Off. |
| 150328 | 5/1903 | Germany |
| 383481 | 10/1923 | Germany |
| 383491 | 10/1923 | Germany |
| 397551 | 6/1924 | Germany |
| 397888 | 6/1924 | Germany |
| 423822 | 3/1926 | Germany |
| 463333 | 10/1928 | Germany |
| 36 00 772 | 7/1987 | Germany |
| 39 20 342 | 8/1990 | Germany |
| 40 07 805 | 9/1991 | Germany |
| 40 13 068 | 10/1991 | Germany |
| 43 01 270 | 1/1994 | Germany |
| 43 15 248 | 11/1994 | Germany |
| WO 93/09888 | 5/1993 | WIPO |

*Primary Examiner*—Arun S. Phasge
*Attorney, Agent, or Firm*—Jacobson, Price, Holman & Stern, PLLC

[57] ABSTRACT

This invention relates to a method for sterilizing microorganisms and/or decomposing organic and inorganic pollutants in ground soil and ground water by means of a specified direct current applied between at least one pair of electrodes incorporated into the ground soil. For decomposition of the organic and inorganic pollutants, soil particles of the contaminated ground soil are polarized by a voltage applied to the electrodes, or already polarized soil particles are additionally polarized by the applied artificial electric field. The applied electric field is preferably aligned with the natural electric field of the soil particles. The increased polarization of the soil particles causes processes of cathodic reduction at the negatively charged interfaces of the soil particles and simultaneously causes processes of anodic oxidation at the positively charged interfaces of the soil particles. The agents for oxidation and reduction are generated from the ground water by water electrolysis when applying a voltage of at least 0.4 V to 2 V per meter of electrode distance for each pair of electrodes.

45 Claims, 1 Drawing Sheet

Period of Decontamination

Period of Decontamination

METHOD RELATED TO THE STERILIZATION OF MICROORGANISMS AND/OR TO THE MINERALIZATION OF ORGANIC SUBSTANCES INCLUDING MICROBIC METABOLITES IN A GROUND REGION AND IN THE GROUND WATER BY MEANS OF ELECTRIC CURRENT

FIELD OF THE INVENTION

This invention relates to a process for the sterilization of microorganisms, and for the mineralization of organic substances in soils and/or in the ground water by means of a direct current applied to at least one pair of electrodes incorporated into the soil.

BACKGROUND OF THE INVENTION

In microbiological processes related to soil remediation the destruction of organic pollutants by microorganisms is furthered by the cultivation and selection of specialized microorganisms with the objective of an improved performance (mutagenesis with predominantly chemical mutagens) which thereafter are fed back into the ground. The central problem of mutagenesis is that mutagenesis can only be controlled during the stage of cultivation. Once the microorganism are fed back into the ground, ongoing mutagenesis in soils is almost impossible to control. Art uncontrolled mutagenesis in a milieu of pollutants, such as pigments, solvents, pesticides etc. can produce mutants, which might be carcinogenic and/or embryotoxic and/or pathogenic.

A second problem is encountered in soil areas where pathogenic microorganisms can be expected to an increased extent. Reference is made to plants disposing of animal bodies, tanneries, and fur treatment plants which are already affected by pathogenic microorganisms such as the anthrax (*Bacillus anthracis*) as well as to abattoirs and farms. In these cases, the problem arises because during microbiological remediation of pollutants the growth of pathogenic microorganisms also simultaneously furthered.

A third problem area can be identified in the United States, England, and Russia where in the context of the biological warfare large-scale field tests have been carried out using extremely dangerous pathogens such as the anthrax (Bacillus anthracis), which render vast areas uninhabitable.

A fourth problem area arises from those substances produced by the activity of microorganisms such as metabolites and organic substances resulting from biosynthesis such substances frequently are more toxic than the pollutants found in the soil before treatment. The majority of these substances tend to be persistent and cannot be decomposed by microorganisms. Classic metabolites are for example aflatoxines, a group of metabolites produced by molds which are highly toxic and, moreover, are carcinogenic, as well as cyano-compounds, originating from Cyanophyceae, a group of about 2,000 one-celled algae.

A fifth problem area is represented by man-made pollution of soils and the ground water with organic substances.

A sixth problem area arises from a variety of insoluble inorganic substances such as mercury sulfide, red lead or arsenic trioxide which cannot be removed from the soil or the ground water by traditional methods or can only be removed at an extremely high cost.

The purpose of this invention is to provide a method for the in-situ sterilization of microorganisms, as well as for the mineralization of metabolites and/or other organic substances in-situ by the conversion of organic substances mainly into carbon dioxide and water. This invention also provides for the split up of insoluble inorganic substances to such an extent that in an aquatic environment these inorganic compounds can be mobilized as ions or colloids.

The present invention is based on the following considerations. Preparatory research and development has been performed by the immunochemistry in the course of the production and sterilization of sera. The basis of this research and development is electrolysis, i.e. the transportation of an electrolyte through a semipermeable membrane. As to electrodialysis, in general two diaphragms are required which enclose a central chamber containing a colloidal solution to be treated, whereas the electrodes are placed in the outer chambers. On the latter basis, German Patent No. DE 383 491 (Elektroosmose AG) discloses an arrangement comprising three chambers and electrodes of approx. 400 $cm^2$ which are intended to sterilize liquids or solids, the latter being saturated with a solution of sodium chloride, within 2 hours at a current of 10–12 A and a direct voltage of 60 V. In this apparatus, *streptococci, staphylococci* and *pneumococci* have been sterilized. Similar apparatus have also been applied in the German Patents DE 397 888, DE 150 328, DE 397 551, and DE 423 822. In these aforementioned patents the electric current was employed to cause the sterilization. The German Patents Nos. DE 463 333 and DE383 481, however, evidenced that the effect of sterilization is not based on the effects of the electric current but on the effects of the weak hydrochloric acid generated by the dissociation of the solution of sodium chloride. An application of aforesaid techniques to the treatment of soils and/or the ground water are not yet known.

As to the remediation of soils, electrokinetic processes using two or more electrodes are described in U.S. Pat. Nos. 5,137,608 and 5,074,986, as well as in the European Patent EP 0 312 174 and in the German Patent DE 39 20 342. By the aforesaid electrokinetic processes pollutants such as soluble heavy metal compounds, and some polar organic substances, such as phenol, are simply transported to the electrodes. Most of the inorganic compounds will precipitate on the electrodes while the organic substances will accumulate close to the electrodes or be converted by electrode reactions.

This invention, however, by applying techniques such as pole reversal of the electric field and a low density of current, will prevent electrokinetic transportation of pollutants through the soil. Instead, the pollutants are treated in situ, i.e. mineralized by non-Faraday processes.

In the German patent application No. DE 43 01 270.1 corresponding to U.S. Pat. No. 5,595,644, a process is described by which harmful materials are caused to decompose in situ by the generation of an ionization channel between electrodes via application of a voltage in the ground region so as to increase the conductivity of the ground region affected. The electric voltage is regulated by adjusting the current such that the energy supplied is equal to or greater than the electron affinity of the atoms making up the harmful materials in the treated ground region. In accordance with subclaim 29 of this patent and claim 9 in the above-identified corresponding U.S. patent, the harmful substances undergo oxidation by electron reactions.

In the German patent application No. DE 43 15 248, another method for the decontamination of soils has been described. Electrolytes are fed into the soil enabling electrolysis in combination with another electrolyte which, in the electric field between electrodes, produce ions that on their part will react with the pollutants so as to convert the pollutants into harmless substances.

Further prior art processes relate to electrochemical decomposition of pollutants in apparatus and equipment such as indicated in the German patent applications DE 40 07 805, DE 36 00 772 or DE 40 13 068.

DETAILED DESCRIPTION OF THE PREFERRED EMBODIMENTS

Figure 1:
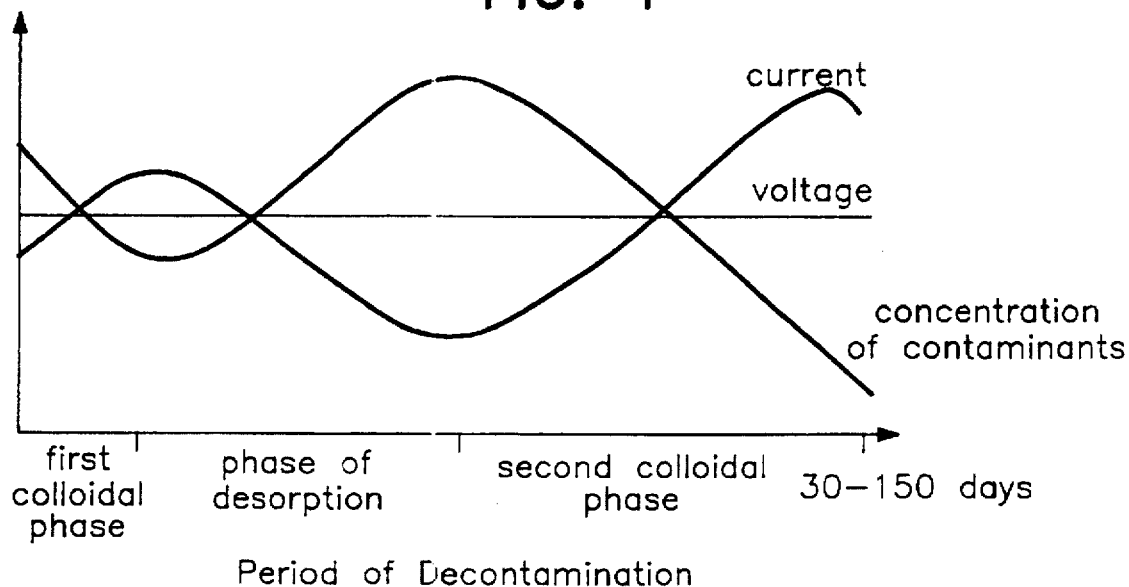
FIG. 1 is a graph illustrating the in situ remediation of unpolar substances in ground soil in accordance with the present invention with current, voltage and concentration of contaminants plotted against the days of remediation.

For purposes of clarification and differentiation of the present invention from the disclosures in the above referenced patents and patent applications, some definitions are required. In accordance with the current state of the art defined by electrochemistry, any and all electrochemical reactions basically must take place at or close to the electrodes. See D. Rahner, H. Gruenzig, Die Anwendung elektrochemischer Verfahren zur Sanierung kontaminierter Boeden—Stand und Probleme; in: Umweltbundesamt: Verfahren zur elektrochemischen Sanierung von Altstandorten, Berlin 1994 (The Application of Electrochemical Processes for the Electrochemical Remediation of Polluted Sites—State of the Art and Problems, in: Umweltbundesamt (editor): Processes for the Electrochemical Remediation of Polluted Sites, Berlin 1994). As a result of experiments and tests in the laboratory, bench mark tests and in field tests performed in connection with the present invention, a new knowledge differing substantially from the present state of the art has been developed. Taking into account the specific physical and chemical properties of soils, it has been discovered that in accordance with the present invention electrochemical reactions can take place on any and all individual soil particles. Soil (ground) is defined as a region comprising mineral soil particles, microorganisms, organic and inorganic particles of pollutants (all of them altogether are hereinafter referred to as soil particles) either in natural compaction or as refill. The mineral particles in general have particle sizes of approx. 0.001 mm to greater than 100 mm. The minerals in the chemical sense are not pure, but contain, with the exception of the noble gases, impurities built into the crystal lattices which almost cover all natural elements of the periodical system. A variety of these chemical elements are well known as catalysts.

Almost all natural soils contain water in the form of captive water and capillary water. This water is capable of conducting electrons since the water contains electrolytes. The determination of the electric conductivity of water is a standard method to determine the quality of the water. From hydrogeology it is known that almost all soil particles are surrounded by a hull of captive water. Within the framework of this invention we have detected that the hull formed by the captive water corresponds to the colloidal model developed by Nernst and Stern and that this hull can be defined as comprising two distinct layers of captive water with an overall thickness of approx. 0.1 to 0.15 µm (or approx. 200 molecular diameters). Furthermore, within the framework of the research on this invention we have detected that this captive water is the decisive prerequisite for the passage of an electric current through the soil. An additional doping of the ground water with electrolytes has proven not, or only marginally, to modify the parameters of the electric current.

The pollutants, also surrounded by a hydrate layer, in different ways are tied to the soil matrix. A part of the pollutants form colloids and can be mobilized within the capillary system of the soil, when the capillary system is saturated by water. Unpolar pollutants in general are hydrophobically adsorbed onto the soil particles. Polar substances such as phenol frequently are coordinated with the soil particles via the water layer forming a bridge or bridges which are frequently referred to as "metal-organic" coordinate bonds. The organic substances adsorbed or coordinated to soil particles which escape mobilization still need to be removed from the ground and the ground water as well.

Soils also represent a complicated geoelectric system. Natural electrical fields are regularly developed in soils for different reasons. Field tests evidenced dc voltages in between 5 mV and 1 V (measured between 2 electrodes at a distance of 1 meter), partly superimposed by vagabonding ac voltages up to 23 V. Furthermore, the ground partly is a strong capacitor with a capacitance between 5 and 30 F.

Since natural electric fields are directed, almost all soil particles hold a stable bipolar electric charge. The electrical system of the soil particles again forms part of a wider natural electric field of the ground. Not only the electric polarization of the soil particles, but also the polarization of microorganisms at the interface between ground water and cell wall, is exploited for purposes of this invention. In contrast to equipment where the number of electrodes determines the number of cathodes and anodes, ground soil contains an almost infinite number of soil particles, which are charged on one side positively (anodically) and on the opposite side negatively (cathodically).

In distinction to hitherto known processes, the present invention is based on the geophysical phenomenon related to the polarization of the individual soil particles and the reinforcement of the already existing electrical fields in soils as well as in the ground water.

In our research we detected that the polarization of the soil particles and the formation of bipoles is connected with the so-called capacitor effect. In accordance with this effect, if the direction of the natural field and the direction of the electric current required for the remediation coincide, the capacitor effect causes an addition of the capacitor current of the soil to the intensity of current applied. On the other hand if the current required for the remediation of the soil is directed against the direction of the natural electric field, a subtraction of the currents will take place. A correct application of the current in strict compliance with this invention therefore superimposes the remediation current coincident with the natural electrical fields. In some circumstances, the generated electric field can be placed transversely to the natural electric field. In a field test using fine sands for the ground soil and at a direct voltage of 12 V the intensity of current devoted to the remediation totalled 5.6 A and the capacitor current was 4.4 A. Where there was coincidence of the electric fields, both artificial and natural, the amperage added up to 10 A; while in the opposite case where the remediation current was opposite to the natural electric field, the amperage by subtraction totalled 1.2 A.

In the event that an electric current is applied to the aquatic system of ground soils, the redox reactions must take place at any and all soil particles. Electrolysis of water forms part of the system of the redox reactions. Contrary to all hitherto known processes, the places where redox reactions take place are predominantly not the electrodes but any and all soil particles. Subsequently, we determined that applying a dc current of at least 1.68 V/m, water electrolysis took place, thus providing the required agents for oxidation and reduction to any and all of the individual soil particles. Other reactions related to the decomposition of pollutants are performed by hydrolysis, again supported by catalysis. The hydrolysis of benzene may serve as an example according to the following reactional equation:

$$C_6H_6 + 12\ H_2O \rightarrow 6\ CO_2 + 30\ H^+ + 30\ e^-$$

The sequences of the stepwise decomposition of organic pollutants has been identified on the basis of the analysis of more than 2,100 GC-MS-chromatograms organized in 400 series of measurement. The decomposition processes can be defined according to the following stepwise sequence:

a. macromolecular aliphates or polycyclic compounds are cracked first at preferential breaking points. $C_{36}$ changes to $C_{12}$, thereafter to $C_6$ and $C_3$, polycyclic aromatic hydrocarbons (PAH) break up the BTEX level;

b. simultaneous oxidation of the hydrocarbons is carried out forming alcohols;

c. then to aldehydes and/or ketones;

d. then to carboxylic acids;

e. the carboxylic acids are finally oxidized to $CO_2$ and water.

In detail, we have determined that in the course of decomposition of petroleum hydrocarbons (DIN 38409 H18; aliphatic chains) we identified processes related to the reduction of compounds, such as fractioning of the aliphatic chains, as well as processes related to the oxidation of compounds, such as formation of carboxylic acids. These processes according to steps a, b, c, d, and e above, can be illustrated as follows:

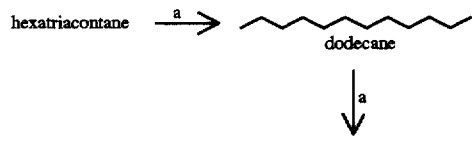

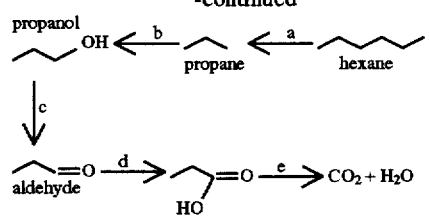

The decomposition of monoaromates can be compared with the decomposition of petroleum products. The decomposition of a monoaromate, such as toluene, follows the sequence of an aromatic alcohol (b), which is oxidized to an aldehyde (c) which on its part will be oxidized to benzoic acid (d) which again will be decomposed to carbon dioxide and water. This decomposition can be illustrated, as follows:

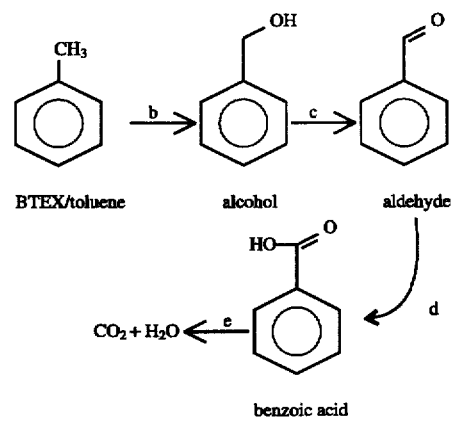

As far as PAH are concerned, by proper application of the invention, the multiple ring compounds will be cracked to the level of naphtalene (two ring compound) and/or monoaromates. Thereafter the above described processes of oxidation (b, c, d, and e) will take place, as illustrated below:

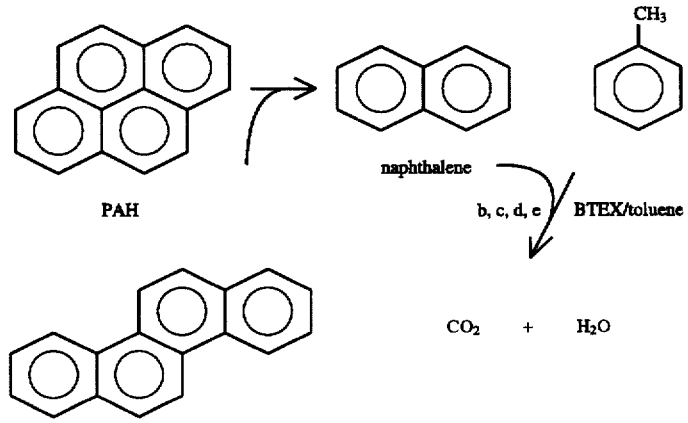

In the course of a remediation, the concentration of naphtalene and BTEX initially will rise prior to the oxidation of PAH to carbon dioxide and water.

As far as chlorinated hydrocarbons are concerned, including volatile, semi-volatile and non-volatile chlorinated organic compounds, a gradual dehalogenation (reduction) will take place. Having performed remediation on non-volatile chlorinated hydrocarbons, such as hexachlorobutadiene, we determined that chlorinated compounds were reduced to the level of aliphates (petroleum products). The aliphates identified were then subsequently mineralized by processes of oxidation as described above. In laboratory tests, the dehalogenation of volatile chlorinated solvents has been determined according to the following steps: perchloro-ethylene, trichloro-ethylene, dichloro-ethylene (cis-, trans-), monochloro-ethylene and a subsequent oxidation of ethylene to carbon dioxide, water and chlorides, which can be illustrated as follows:

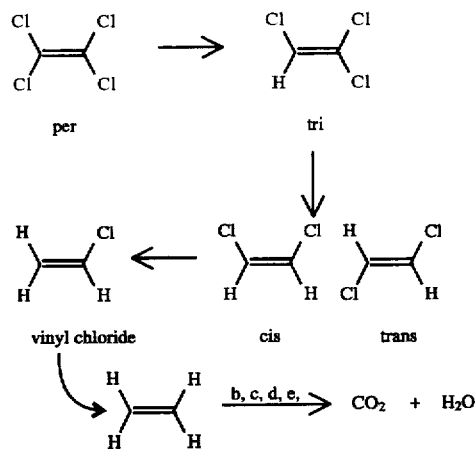

Also other cyclic chloro-organic compounds are first dehalogenated and subsequently mineralized via processes of oxidation. In bench mark tests using -lindane, at the end of the test only traces of chloro-benzene and phenol (most probably the remainder of the emulsifier) have been identified.

The decomposition of nitric compounds, such as acetonitrile is accomplished via hydrolysis of primary amides to acetic acid. Subsequently the organic acid is mineralized. This decomposition can be illustrated, as follows:

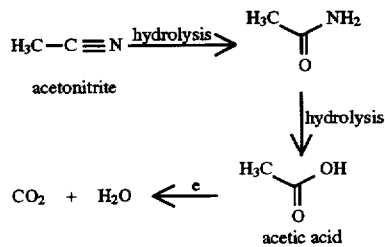

While decomposing amines, we determined an intermediate step in the formation of azo- and triazo-compounds. These latter products were subsequently decomposed to pure nitrogen ($NO_x$ or $NH_x$ were not detected), carbon dioxide and water.

Other nitrocompounds such as nitroaromates, are converted in a preliminary step into azo compounds such as azobenzene. This type of reduction is applied by the chemical industry in the synthesis of azoaromates. From azobenzene, nitrogen will be split off forming now benzene. Benzene will then be mineralized as described above. This decomposition is illustrated as follows:

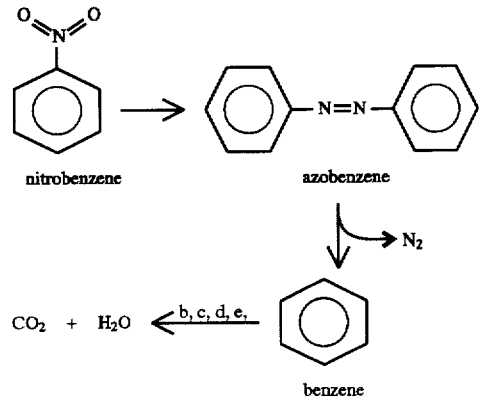

The extent of the reactions related to the decomposition of the pollutants depends largely on the intensity of the current. By interface and redox reactions, it is possible in accordance with the present invention to decompose even insoluble inorganic compounds which are converted into either soluble or colloidal compounds. The mobilization and precipitation of these compounds, however, are not the subject of our present invention.

The alkaline metals, alkaline earth metals, aluminium, silicon, as well as heavy metals such as copper, iron, and nickel, which are tied in the crystal lattices of the soil particles or dissolved in the groundwater, serve as catalysts which assist the processes related to the decomposition of the pollutants, while at the same time serve to reduce considerably the activating energy required for the reactions, such that even compounds requiring a high activating energy can be decomposed under the influence of the energy parameters used by the present invention. The minerals and/or heavy metals in the soil and the groundwater also react directly with the compounds and metabolites respectively serving as agents in the redox reactions and in the decomposition of the organic compounds. In strongly eluted soils, it is known to inject soluble, dispersed catalysts into the soil, preferably Fe, Mn and Ni catalysts, in order to promote the redox and/or hydrolysis reactions.

In a test performed in a container containing approximately 10 metric tons of polluted soil, the extent of the sterilization of microorganisms has been examined. Prior to the bench mark test, the polluted soil was treated by a mix of microorganisms. By biodegradation a significant quantity of metabolites was produced including acetals, aldehydes, ketones, amines and amides. In compliance with German practice and prior to the intended disposal of the soil on a German hazardous waste deposit, sterilization of the soil was required. By applying a current of 20.83 A/m$^2$ of electrode surface and at 60 V dc, the soil was sterilized completely after 72 hours. After sterilization of the soil, electrochemical treatment of the soil in accordance with the present invention continued without changing the parameters of the electric current. Using a GC-mass spectrometer (GC-MS) it was determined that the concentration of so-called natural substances such as alanine, carotenal, cholestene, conanine-amine, dinorgammaceran were reduced after 20 days of electrochemical treatment to less than 11% of the starting concentration. The electrochemical treatment of the soil continued for another 43 days with the objective to mineralize the remaining metabolites. At the end of the above mentioned period we proved by GC-MS, that pollution by metabolites has been reduced by about 96%.

Figure 2:
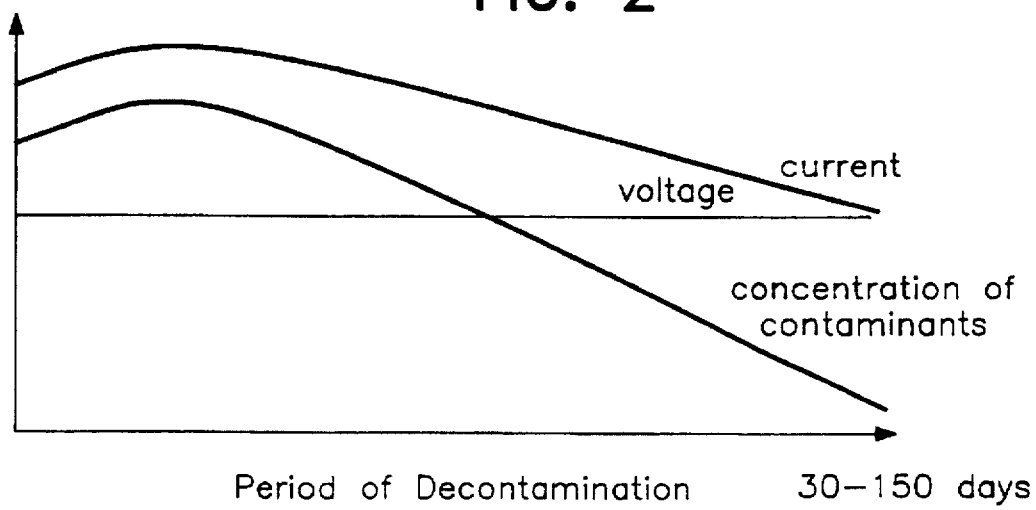
FIG. 2 is a graph illustrating the in situ remediation of polar substances in ground soil in accordance with the present invention with current, voltage and concentration of contaminants plotted against the days of remediation.

The development of the concentration of pollutants during the electrochemical remediation of the soil and of the ground water is characterized by typical curves which reflect the parameters of the electric current applied. The curves illustrated in FIGS. 1 and 2 depict regularities in the in situ remediation of the ground and are used for purposes of the control of the processes. FIG. 1 depicts the development of unpolar substances such as aliphates and PAH. Bearing in mind that the voltage is kept constant, in the first phase of remediation taking 3 to 20 days, the intensity of current will increase while the specific resistivity of the soil will decline; in parallel, the concentration of pollutants will also decline. This phase is called "first colloidal phase" since colloidal pollutants within the capillary system of soils are mineralized. The second phase will take about 20 to 40 days. Again, with the voltage being kept constant, the intensity of the current will decline by slightly more than 50%, and the specific resistivity will increase correspondingly. The concentration of pollutants will also increase, partly beyond the initial values. This phase is denominated the "phase of desorption" since the pollutants adsorbed by or coordinated with the soil particles are desorbed and are becoming capable of chemical analysis. The third phase takes about 5 to 20 days. The desorbed pollutants, being converted into colloids will now be mineralized. Again, with the voltage kept constant, the intensity of the current will increase and the specific resistivity of the soil will decline. This phase is called the "second colloidal phase". The end of remedial work is indicated, again with the voltage being kept constant, by a drop in the intensity of the current and by an increase in the specific resistivity of the soil to a level comparable to the specific resistivity of similar unpolluted soil.

Another illustration of the electric parameters of the present invention is depicted in FIG. 2 which relates to polar substances. In this case, again with the voltage kept constant, the intensity of current increases slightly and more or less in a linear pattern. After 40 to 60 days, the parameters will decline corresponding to the extent of decomposition of the pollutants. The end of remedial work is indicated when the comparative level of the specific resistivity of a similar unpolluted soil is reached. The break related to the intensity of current indicating the end of the second colloidal phase in the treatment of unpolar substances can be observed to a lesser extent. The amplitude of the changes related to the intensity of current depends on the type and the concentration of pollutants; the amplitude may be 50% and more compared with the intensity of the current at the beginning of the remediation.

We observed in laboratory tests when using inert electrodes that the pH of the soil to be treated changes dramatically during the remediation. More specifically, the pH declines in the area of the anode and rises in the area of the cathode. In the field, however, when proceeding properly in accordance with this invention, the pH will stabilize between 6.5 and 7.8, an effect which is independent from the pH encountered before treatment begins. In field tests, we found that the pH of the soil and the ground water can be controlled by the selection of appropriate electrode materials. For this purpose, carbon steels and/or low alloyed steels have proven to be advantageous.

The layout of the electrodes for the remediation can be described as follows. At least two electrodes are required. The shape of the electrodes can be either hollow, such as a tube, sheet metal, or a solid mass. Depending on the working depth, the electrodes may be placed into the soil vertically or horizontally. The distance between electrodes depends on the topographic and geoelectric conditions of the site including existing buildings. Preferably, the distance between electrodes should be on the order of 6 to 30 meters, and more in the event of circumstances of a special case.

For larger sites, an arrangement comprising a plurality of electrodes can be used, connected together in pairs of electrodes each comprising an anode and a cathode. In order to cover the complete site, the formation of pairs of electrodes will require a double connection of electrodes, with the exception of the outer electrodes as illustrated hereinafter with anode=(A); cathode=(K). For example, two rows of electrodes could be connected as follows:

A<−>K<=>A<=>K<−>A(row 1)
A<−>K<=>A<=>K<−>A(row 2)

in which <=> means a double connection of the corresponding electrode and <−> a single connection.

The wiring of the electrodes in a multiple electrode arrangement can either be in a row, with a unipolar connection of the corresponding electrodes or be carried out about cross focussing. The connecting arrangement essentially depends on the geoelectric conditions of the site and the concentration and type of pollutants in the soil as well as on other parameters of the site.

Further, the electricity supply system of the electrodes, i.e. the current source should strictly be separated from the main source of electric power by any suitable device, such as, but not limited to, a separating transformer.

The minimum dc voltage for one pair of electrodes should be in the range of 0.4 V dc to 2 V dc, preferably 1.68 V dc per meter of electrode distance per pair of electrodes. Depending on the type of soil, the water content and the degree of pollution, a voltage drop may occur locally in the vertical direction, i.e. with the depth. This voltage drop should be compensated by increasing the voltage.

A direct pulse voltage, a direct current, but also a frequency modulated ac, are appropriate to perform the above described electrochemical reactions.

Preferably, the potential related to a pair of electrodes is strictly to be galvanically separated from the others.

Preferably, the polarity within a pair of electrodes should be periodically reversed, the timing being determined depending on the direction and strength of the natural electric fields, unless the subtraction of the capacitor current of the soil contradicts the reversing. The reversing is to be performed without potential on the contactors. This means that there is no voltage, as well as no current, applied to the contactor. This contactor is driven by an auxiliary voltage. Thereby short circuits and sparking can be avoided.

The surface of electrodes should be maximized in relation to their length.

The electrode material should preferably be a carbon steel, but also, if desired, other electrically conductive material can be used. When incorporating the electrodes into the ground, the open space dug around the electrodes and the ground should be refilled with sand or gravel having a particle size equal to or smaller than the average particle size of the adjacent ground being treated. Further, we determined that the minimum moisture content of the ground, determined as capillary water, should be at least 6%. If the minimum moisture is not met in the ground, the soil should preferably be moistened by any appropriate method known in the art. As far as horizontal electrodes are concerned, the humidification of the soil should be performed preferably via a dispensing device placed on or attached to the electrode.

The intensity of the electric current required to sterilize the soil and the ground water depends on the genus of the microorganisms to be treated. We determined that preferably the intensity of current should range between 20 A and 250 A per m² surface of electrode. The duration of the treatment depends on the genus of microorganisms to be treated and should take at least 2 hours. As far as the mineralization of organic substances and the treatment of insoluble inorganic substances is concerned, the amperage preferably should range between 1 A and 20 A per square meter surface of electrodes.

We claim:

1. A method for sterilizing microorganisms or decomposing organic and inorganic pollutants or both in a contaminated ground region of soil containing water and soil particles having a natural polarization, which comprises:
   (a) incorporating at least one pair of electrodes into the soil;
   (b) applying to the electrodes a voltage of at least 0.4 V to 2 V per meter of electrode distance per pair of electrodes to additionally increase by a generated electric field said natural polarization of the soil particles thereby effecting processes of cathodic reduction at negatively charged interfaces of the soil particles and simultaneously effecting processes of anodic oxidation at positively charged interfaces of the soil particles; and
   (c) generating agents for said anodic oxidation and said cathodic reduction by water electrolysis from the water.

2. A method according to claim 1, wherein redox reactions at the interfaces of said soil particles effect a mineralization of said organic compounds and a splitting up of insoluble inorganic compounds.

3. A method according to claim 1, wherein said direct current is applied to an intensity ranging from 1 A to 20 A per square meter of electrode surface for purposes of mineralization of organic compounds and split up of insoluble inorganic compounds.

4. A method according to claim 1, wherein said direct current is applied to an intensity ranging from 20 A to 250 A per square meter of electrode surface for purposes of sterilization of microorganisms.

5. A method according to claim 1, wherein the electrochemical reactions are supported by doping the ground and captive water with catalysts.

6. A method according to claim 1, wherein the generated electric field substantially coincides with the natural polarization of said soil particles.

7. A method according to claim 1, wherein the generated electric field is generally transverse to the natural polarization of said soil particles.

8. A method according to claim 1, wherein a direct current or a pulsing direct current or a frequency modulated alternating current is applied.

9. A method according to claim 1, wherein the electricity supply system of the electrodes is isolated from the main source of electric power.

10. A method according to claim 1, wherein multiple pairs of electrodes are incorporated and the potentials of said pairs are segregated from each other.

11. A method according to claim 1, wherein in a multiple electrode arrangement the electrodes are switched by row, with unipolar connection of the electrodes.

12. A method according to claim 1, wherein the poles of each pair of electrodes are reversed in a defined stroke.

13. A method according to claim 1, wherein the electrode material is a carbon steel or a low alloyed steel.

14. A method according to claim 1, wherein the electrodes are incorporated into the soil either horizontally or vertically at a distance of about 6 meters to about 30 meters.

15. A method according to claim 1, wherein the area of the electrodes laid horizontally are moistened by a dispenser close to or attached to the electrode thereby also preventing desiccation of the said area by electroosmosis.

16. A method according to claim 1, wherein the voltage with regard to the decomposition of unpolar substances is kept constant as long, as in a first phase, the intensity of current will increase, as in the second phase the intensity of current will drop, as in a third phase the intensity of current will increase again and as thereafter the intensity of current will drop again until the specific resistivity of the ground will reach the specific resistivity of a comparative and unpolluted soil.

17. A method according to claim 1, wherein the voltage with regard to the decomposition of polar substances is kept constant as long as the intensity of current applied first increases and thereafter drops until the specific resistivity of the ground region reaches the specific resistivity of a comparative and unpolluted soil.

18. A method for the treatment of contaminants in a region of ground soil containing soil particles and water which comprises applying to at least one pair of electrodes extending into said region of ground soil a voltage of at least 0.4 V per meter of electrode distance per pair of electrodes and passing a direct current through said soil particles in order to alter a natural polarization of said soil particles and effect simultaneously a reduction of said contaminants in situ at negatively charged interfaces of said soil particles and an oxidation of said contaminants in situ at positively charged interfaces of said soil particles to decompose any organic contaminants and inorganic contaminants contained in said region of ground soil.

19. A method according to claim 18, wherein minerals and metals tied in the crystal lattices of said soil particles or dissolved in said ground water serve as catalysts in said reduction and said oxidation.

20. A method according to claim 18, wherein agents for said reduction and said oxidation are generated by water electrolysis from said ground water.

21. A method according to claim 18, wherein the reduction and oxidation reactions are enhanced by doping the ground and captive water with catalysts.

22. A method according to claim 18, wherein the electricity supply system of the electrodes is completely isolated from the main source of electric power.

23. A method according to claim 18, wherein said direct current is applied to an intensity ranging from 1 A to 20 A per square meter of electrode surface.

24. A method according to claim 18, wherein the voltage applied to the electrodes extending into said ground soil region generate an electric field substantially coincident with a natural electric field of said ground soil.

25. A method according to claim 24, wherein the direct current from said generated electric field increases the natural polarization of said soil particles.

26. A method according to claim 18, wherein the voltage applied to the electrodes extending into said ground soil region generate an electric field substantially transverse to a natural electric field of said ground soil.

27. A method according to claim 18, wherein multiple pairs of electrodes extend into said ground soil region and the potential of said pairs are segregated from each other.

28. A method according to claim 18, wherein in a multiple electrode arrangement the electrodes are switched by row with unipolar connection of the electrodes.

29. A method according to claim 18, wherein the poles of each pair of electrodes are periodically reversed.

30. A method according to claim 18, wherein the voltage with regard to the decomposition of unpolar substances is kept constant as long, as in a first phase, the intensity of current will increase, as in the second phase the intensity of current will drop, as in a third phase the intensity of current will drop again until the specific resistivity of the ground will reach the specific resistivity of a comparative and unpolluted soil.

31. A method according to claim 18, wherein the voltage with regard to the decomposition of polar substances is kept constant as long as the intensity of current applied first increases and thereafter drops until the specific resistivity of the ground region reaches the specific resistivity of a comparative and unpolluted soil.

32. An in situ method for removing contaminants in ground soil having a moisture content of not less than 6%, which comprises:

(a) determining a natural electric field of said ground soil containing said contaminants;

(b) incorporating at least one pair of electrodes into said ground soil so that an electric field generated by said electrodes will substantially coincide with said natural electric field of said ground soil;

(c) applying a voltage to the electrodes to generate said electric field and pass a direct current through soil particles of said ground soil to increase the polarization of said soil particles and effect simultaneous reduction at negatively charged interfaces of the soil particles and oxidation at positively charged interfaces of the soil particles; and (d) generating agents for said reduction and oxidation by water electrolysis from said moisture content in said ground soil.

33. A method according to claim 32, wherein said applied voltage is at least 0.4 V per meter of electrode distance per pair of electrodes.

34. A method according to claim 33, wherein said direct current is applied to an intensity ranging from 1 A to 20 A per square meter of electrode surface for mineralization of organic compounds and split up of insoluble inorganic compounds contained in said contaminants.

35. A method according to claim 32, wherein multiple pairs of electrodes are incorporated into said ground soil and the potentials of said pairs are segregated from each other.

36. A method according to claim 32, wherein the poles of each pair of electrodes are periodically reversed.

37. An electrochemical method for the treatment of contaminants in a region of ground soil containing soil particles having a natural polarization which comprises passing a direct current through said soil particles to alter said natural polarization of said soil particles sufficiently to effect reduction of contaminants in situ at negatively charged interfaces of said soil particles and oxidation of contaminants in situ at positively charged interfaces of said soil particles to decompose any organic contaminants and inorganic contaminants contained in said region of ground soil.

38. An electrochemical method according to claim 37, wherein said direct current is generated by applying to at least one pair of electrodes extending into said ground soil a voltage of at least 0.4 V per meter of electrode distance per pair of electrodes.

39. An electrochemical method according to claim 38, wherein said direct current is applied to an intensity ranging from 1 A to 20 A per square meter of electrode surface for mineralization of organic compounds and split up of insoluble inorganic compounds contained in said contaminants.

40. An electrochemical method according to claim 38, wherein the voltage applied to the electrodes generates an electric field substantially coincident with the natural polarization of said soil particles.

41. A method for sterilizing microorganisms in a contaminated region of ground soil containing at least 6% moisture content which comprises:

(a) incorporating at least one pair of electrodes into said ground soil in order to generate an electric field in said region; and (b) applying a voltage to said electrodes to generate said electric field in said region and pass a direct current through said region at an intensity ranging from 20 A to 250 A per square meter of electrode surface to sterilize any microorganisms contained in said contaminated region.

42. A method according to claim 41, wherein said voltage is at least 0.4 V per meter of electrode distance per pair of electrodes.

43. A method according to claim 41, wherein the generated electric field substantially coincides with a natural electric field of said contaminated region.

44. A method according to claim 41, wherein multiple pairs of electrodes are incorporated and the potentials of said pairs are segregated from each other.

45. A method according to claim 41, wherein the electrodes are incorporated into the soil either horizontally or vertically at a distance of about 6 meters to about 300 meters.

\* \* \* \* \*